(12) United States Patent
Shiraishi

(10) Patent No.: US 10,220,557 B2
(45) Date of Patent: Mar. 5, 2019

(54) INJECTION MOLDING SYSTEM

(71) Applicant: FANUC CORPORATION, Yamanashi (JP)

(72) Inventor: Wataru Shiraishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 39 days.

(21) Appl. No.: 15/348,908

(22) Filed: Nov. 10, 2016

(65) Prior Publication Data

US 2017/0136670 A1    May 18, 2017

(30) Foreign Application Priority Data

Nov. 12, 2015  (JP) ................................ 2015-222399
Oct. 3, 2016   (JP) ................................ 2016-195466

(51) Int. Cl.
| | |
|---|---|
| *B29C 45/76* | (2006.01) |
| *B29C 45/26* | (2006.01) |
| *B29C 45/03* | (2006.01) |
| *B29C 45/14* | (2006.01) |
| *B29C 45/18* | (2006.01) |

(52) U.S. Cl.
CPC ............ B29C 45/768 (2013.01); B29C 45/03 (2013.01); B29C 45/14008 (2013.01); B29C 45/1816 (2013.01); B29C 45/766 (2013.01); B29C 45/2673 (2013.01); B29C 2045/14852 (2013.01); B29C 2945/76167 (2013.01); B29C 2945/76347 (2013.01); B29C 2945/76464 (2013.01); B29C 2945/76652 (2013.01); B29C 2945/76826 (2013.01)

(58) Field of Classification Search
CPC ...... B29C 45/2675; B29C 2945/76294; B29C 2945/76826; B29C 2945/76652; B29C 2945/76464; B29C 2945/76347; B29C 45/768; B29C 45/2673; B29C 2045/2677; B29C 2045/2679
See application file for complete search history.

(56) References Cited

U.S. PATENT DOCUMENTS

| | | | | |
|---|---|---|---|---|
| 4,720,253 A | * | 1/1988 | Koentges | ............... B23Q 41/00 264/40.7 |
| 4,802,834 A | | 2/1989 | Neko | |
| 5,246,362 A | * | 9/1993 | Kobayashi | ............ B29C 31/006 425/135 |

(Continued)

FOREIGN PATENT DOCUMENTS

| | | |
|---|---|---|
| JP | 62-170317 A | 7/1987 |
| JP | 4-138232 A | 5/1992 |
| JP | 6-39883 A | 2/1994 |

(Continued)

OTHER PUBLICATIONS

Office Action in JP Application No. 2016-195466, dated Oct. 31, 2017, 9 pp.

*Primary Examiner* — Robert B Davis
(74) *Attorney, Agent, or Firm* — Hauptman Ham, LLP

(57) ABSTRACT

In an injection molding system, an insert formed with a cavity or an insert member for molding an insert-molded article is shot by a camera, and the insert or the insert member to be inserted into a mold is identified based on a characteristic of the insert or the insert member shot by the camera and previously stored data on the insert or the insert member.

10 Claims, 3 Drawing Sheets

(56) References Cited

U.S. PATENT DOCUMENTS 6,054,075 A 4/2000 Inaba et al.
7,125,234 B2 * 10/2006 Scholz .................. B30B 11/005
　　　　　　　　　　　　　　　　　　425/167

FOREIGN PATENT DOCUMENTS

| JP | 6-285913 A | 10/1994 |
|----|------------|---------|
| JP | 7-232239 A | 9/1995 |
| JP | 9-201849 A | 8/1997 |
| JP | 2002-210778 A | 7/2002 |
| JP | 2005-294408 A | 10/2005 |
| JP | 2006-310522 A | 11/2006 |
| JP | 2012-256651 A | 12/2012 |

* cited by examiner

INJECTION MOLDING SYSTEM

RELATED APPLICATIONS

The present application claims priority to Japanese Patent Application Numbers 2015-222399 filed Nov. 12, 2015 and 2016-195466 filed Oct. 3, 2016, the disclosure of which is hereby incorporated by reference herein in its entirety.

BACKGROUND OF THE INVENTION

Field of the Invention

The present invention relates to an injection molding system, and more particularly, to an injection molding system configured to insert a molding auxiliary member, such as an inlet or an insert member, into a mold to achieve injection molding.

Description of the Related Art

There is a known method in which a molding auxiliary member, such as an insert or an insert member, is inserted into a mold for injection molding in an injection molding machine.

Japanese Patent Application Laid-Open No. 6-39883 discloses a technique for an injection molding machine in which inserts are inserted into a mold for molding. This injection molding machine is designed to mold molded articles of different shapes by varying the respective internal shapes of the inserts to be inserted. If molding conditions for the individual inserts to be inserted into the mold are different, according to this technique, the different molding conditions are individually managed as separate molding condition files. If the inserts are frequently changed for molding, however, molding conditions unfit for the insert in the mold may possibly be set for molding, thereby producing defectives.

Moreover, Japanese Patent Application Laid-Open No. 9-201849 discloses a technique in which molding is performed after an insert member is inserted into a mold, whereby a molded article integral with the insert member is molded. According to this technique, a plurality of types of insert members are provided so that a plurality of insert-molded articles can be obtained for the individual insert members. However, different molding conditions for the insert-molded articles are individually managed as separate molding condition files. If a wrong insert member is inserted into the mold, therefore, mold failure or defective molding may possibly be caused.

SUMMARY OF THE INVENTION

Accordingly, the object of the present invention is to provide an injection molding system capable of preventing wrong molding in conditions unfit for molding auxiliary members, such as inserts and insert members.

An injection molding system according to the present invention is configured to insert a molding auxiliary member into a mold to carry out molding and comprises a shooting unit for shooting the molding auxiliary member, a molding auxiliary member data storage unit for storing at least one molding auxiliary member data in which a characteristic of the molding auxiliary member is stored, and a molding auxiliary member identification unit for identifying the molding auxiliary member inserted into the mold. The molding auxiliary member identification unit is configured to identify the molding auxiliary member shot by the shooting unit, based on the characteristic of the molding auxiliary member captured by the shooting unit and the molding auxiliary member data stored by the molding auxiliary member data storage unit.

According to this injection molding system, the molding auxiliary member shot by the shooting unit can be identified based on the molding auxiliary member data stored by the molding auxiliary member data storage unit, so that the molding auxiliary member inserted into the mold can be identified and the possibility of a mistake being made in setting a molding condition or the like thereafter can be reduced.

The molding auxiliary member may be an insert formed with a cavity or an insert member for molding an insert-molded article.

The molding auxiliary member data storage unit may be configured to store, as the molding auxiliary member data, a molding condition in which the molding auxiliary member is inserted into the mold and molded, in addition to the characteristic of the molding auxiliary member. In this embodiment, the molding auxiliary member data storage unit is also stored with the molding condition corresponding to the molding auxiliary member, so that molding can be performed with the stored molding condition when the molding auxiliary member is identified.

The molding auxiliary member may be shot by the shooting unit so that the characteristic of the molding auxiliary member can be analyzed based on image data for the shot molding auxiliary member, and the analyzed characteristic may be stored as the molding auxiliary member data in the molding auxiliary member data storage unit. In this embodiment, the characteristic of the molding auxiliary member is stored in the molding auxiliary member data storage unit based on the image data for the molding auxiliary member captured by the shooting unit, so that data can be created by using the shooting unit without the necessity of preparing data including the characteristic of the molding auxiliary member or the like in advance.

The molding auxiliary member in the mold can be identified by the molding auxiliary member identification unit when the molding auxiliary member in the mold is changed for insertion, and a molding condition corresponding to the identified molding auxiliary member can be read from the molding auxiliary member data storage unit and set.

The injection molding system may comprise an insert member standby section on which the molding auxiliary member is placed on standby, outside the mold, and the molding auxiliary member identification unit can identify the molding auxiliary member inserted into the mold based on information on the molding auxiliary member remaining on the insert member standby section.

The injection molding system may further comprise a molding condition setting unit for setting a molding condition as a set molding condition, and the molding auxiliary member corresponding to the set molding condition may be inserted into the mold if the set molding condition disagrees with a molding condition for the molding auxiliary member data corresponding to the molding auxiliary member in the mold identified by the molding auxiliary member identification unit when the set molding condition is set by the molding condition setting unit.

A metering process may be started after molding condition setting when the molding condition is newly read from the molding auxiliary member data storage unit and set.

The injection molding system may be configured to issue a warning if a molding condition corresponding to a molding auxiliary member to be inserted next is different from the currently set molding condition.

A unit for inserting the molding auxiliary member into the mold may be a robot.

The shooting unit may be attached to a unit for inserting the molding auxiliary member into the mold.

According to the present invention, there can be provided an injection molding system capable of preventing wrong molding in conditions unfit for molding auxiliary members, such as inserts and insert members.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

An injection molding system according to a first embodiment of the present invention will first be described with reference to FIGS. 1 to 3.

Figure 1:
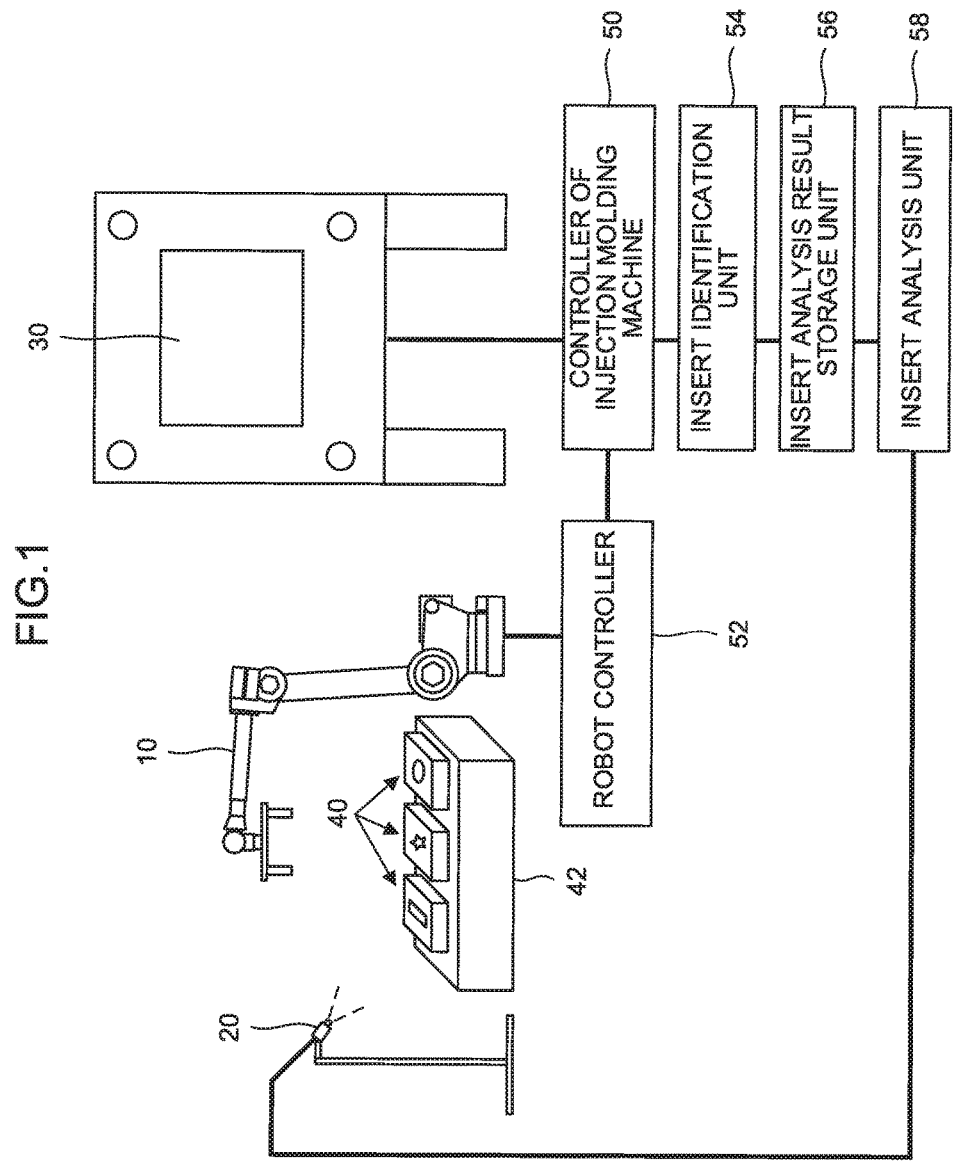
FIG. 1 is a diagram for illustrating an outline of an injection molding system according to a first embodiment of the present invention.

FIG. 1 is a diagram illustrating an outline of the injection molding system according to the first embodiment of the present invention.

A plurality of types of inserts 40 each formed with a cavity are provided in advance on an insert standby section 42 and are bound to be inserted into an insert hole formed in a mold 30 of an injection molding machine. An articulated robot 10 having a holding part on its distal end, as shown in FIG. 1, is used to insert the inserts 40 into the mold 30. The respective cavities of the prepared inserts 40 of the plurality of types are differently shaped so that the shape of an article to be molded can be changed by changing the type of the insert 40 to be inserted into the mold 30.

In order to shoot the inserts 40 placed on the insert standby section 42, a camera 20 is secured to the floor, as shown in FIG. 1. The drive of the mold 30 is controlled by a controller 50 of the injection molding machine. On the other hand, the motion of the articulated robot 10 is controlled by a robot controller 52. The controller 50 of the injection molding machine and the robot controller 52 are connected to each other.

Moreover, the controller 50 of the injection molding machine is connected to an insert identification unit 54 as well as to the mold 30. The insert identification unit 54 is connected to an insert analysis result storage unit 56, which is connected to an insert analysis unit 58. Furthermore, the insert analysis unit 58 is connected to the camera 20.

Figure 2:
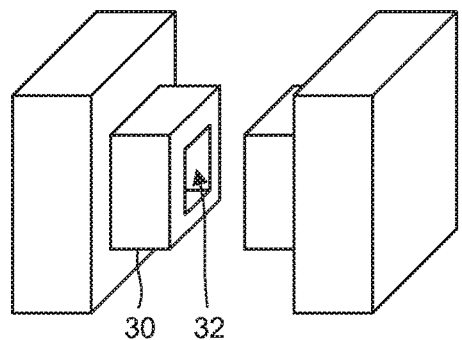
FIG. 2 is a perspective view of a mold in the injection molding system of FIG. 1.

FIG. 2 is a perspective view of the mold 30 of FIG. 1.

The mold 30 is provided with an insert hole 32. Any one of the inserts 40 on the insert standby section 42 can be inserted into and mounted in the insert hole 32 by the articulated robot 10.

Figure 3:
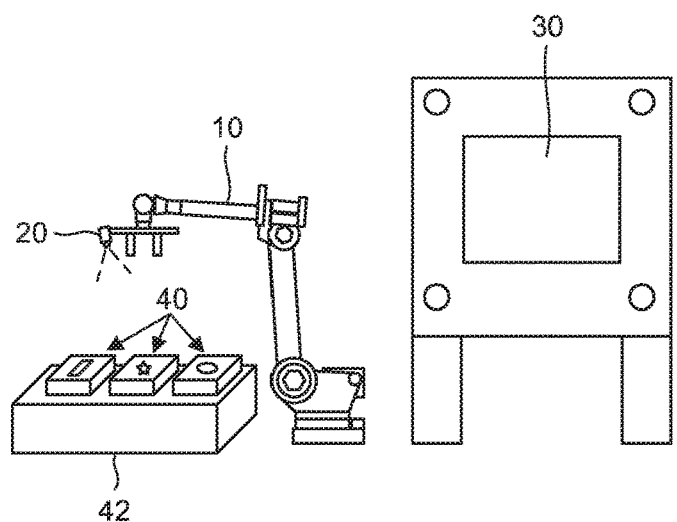
FIG. 3 is a diagram showing a modification in which a mounting position of a camera in the injection molding system of FIG. 1 is changeable.

FIG. 3 is a diagram showing a modification in which a mounting position of the camera 20 in the injection molding system of FIG. 1 is changeable. Those components which are not shown in FIG. 3 are arranged in the same manner as their counterparts shown in FIG. 1 (in which the mounting position of the camera 20 is fixed).

While the camera 20 shown in FIG. 1 is fixedly installed on the floor, the camera 20 shown in FIG. 3 is secured to the distal end portion of the articulated robot 10.

The camera 20 is used to shoot and identify the inserts 40. The camera 20 may be either fixedly installed on the floor, as shown in FIG. 1, or movably attached to the distal end portion of the articulated robot 10, as shown in FIG. 3, only if it is enabled to identify the inserts 40. Since the camera 20 is used to determine the characteristic of each insert 40, it should preferably have a sufficiently high resolution to analyze images representative of the shape of the cavity of the insert 40, groove length, hole and pin positions, engraved marks and the like.

The camera 20 shown in FIG. 1 is shooting the inserts 40 placed on the insert standby section 42. On the other hand, the camera 20 shown in FIG. 3, attached to the articulated robot 10, is movable, so that it can shoot both the inserts 40 on the insert standby section 42 and the insert 40 mounted in the mold 30 by moving the articulated robot 10.

The insert analysis unit 58 analyzes the characteristic of the inserts 40 based on image data on the inserts 40 captured by the camera 20 and sample data extracted from the image data. To achieve this analysis, the overall image of the cavities of the inserts 40 may be regarded as the characteristic corresponding to each insert 40. Alternatively, images captured by the camera 20 may be binarized by light and shade so that the areas of white or black parts of grooves of the cavities of the inserts 40 can be calculated and associated with the inserts 40. Moreover, the lengths of boundary lines between white and black parts and the positions and numbers of circles within a predetermined shooting area of the camera 20 may be associated with the inserts 40. Furthermore, characters, symbols, and barcodes engraved on the outer peripheries of inserts 40 and shapes for the identification of the inserts 40 may be associated with the inserts 40.

Analysis data for the inserts 40 analyzed by the insert analysis unit 58 are stored in association with the inserts 40 in the insert analysis result storage unit 56. As this is done, molding conditions for molding the insert 40 inserted into the mold 30, in addition to the analysis data for the inserts 40, can be stored in association with the analysis data for the inserts 40. If the molding conditions are previously stored in addition to the analysis data for the inserts 40, a molding condition corresponding to an inserted insert 40 can be output when the insertion of the insert 40 is determined.

In the present embodiment, the characteristics of the inserts 40 are analyzed based on the image data on the inserts 40 captured by the camera 20 and the sample data extracted from the image data, and the analyzed data are stored in association with the inserts 40 into the insert analysis result storage unit 56. However, the analysis data need not always be stored based on image data captured by the camera 20, into the insert analysis result storage unit 56, and externally created data for the inserts 40 may alternatively be stored in association with the inserts 40 into the insert analysis result storage unit 56.

The insert identification unit 54 can identify the shot inserts 40 by comparing the analysis data stored in the insert analysis result storage unit 56 or the externally given data with the image data captured by the camera 20.

In the present embodiment, the articulated robot 10 is used as an insert inserting means. If the articulated robot 10 is thus used to insert and eject the inserts 40, the insert/eject operation for the insert 40 can be performed in a free posture, so that the inserts 40 can easily be inserted and ejected despite their possibly complicated shapes.

As shown in FIG. 1, the inserts 40 are previously arranged side by side on the insert standby section 42. In the insert identification performed by the insert identification unit 54, as mentioned before, the insert 40 shot by the camera 20 may be identified by comparing the analysis data stored in the insert analysis result storage unit 56 or the externally given data with the image data captured by the camera 20. Alternatively, the standby positions of the inserts 40 on the insert standby section 42 may be previously stored as standby position information, in association with the analysis data for the inserts 40 and the like, in the insert analysis result storage unit 56. Also, the insert 40 inserted in the mold 30 can be identified by shooting the inserts 40 left on the insert standby section 42 to analyze that the insert 40 in a specific position is absent.

Moreover, the injection molding machine may be provided with a molding condition setting unit capable of setting the molding conditions. Such a molding condition setting unit may be a data input device or data storing device that is mounted to the injection molding machine or a data input device installed outside the injection molding device. If molding conditions corresponding to the type of the insert identified by the insert identification unit 54 and the molding conditions set by the molding condition setting unit are different, the insert 40 corresponding to the molding conditions set by the molding condition setting unit may be selected so that it can be inserted in place of the insert 40 in the mold 30.

An injection molding system according to a second embodiment of the present invention will now be described with reference to FIGS. 4 and 5.

Figure 4:
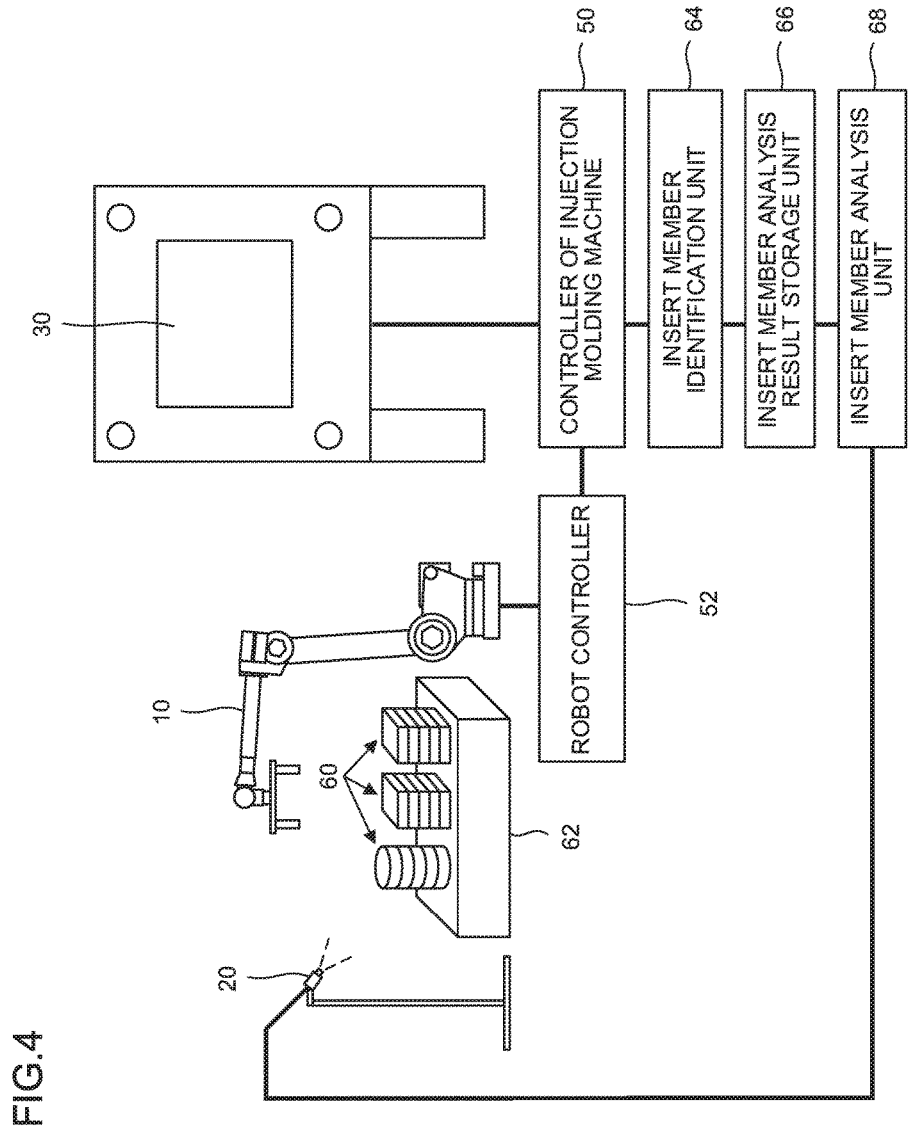
FIG. 4 is a diagram for illustrating an outline of an injection molding system according to a second embodiment of the present invention.

FIG. 4 is a diagram illustrating an outline of the injection molding system according to the second embodiment of the present invention.

A plurality of types of insert members 60 for molding molded articles integral with an injected resin are provided in advance and one of them is inserted into a mold 30 of an injection molding machine. An articulated robot 10 having a holding part on its distal end is used to insert the insert members 60 into the mold 30. The prepared insert members 60 of the plurality of types are differently shaped so that different insert-molded articles can be molded by changing the type of the insert member 60 to be inserted into the mold 30.

A camera 20 for shooting the insert members 60 is secured to the floor, as shown in FIG. 4, and the insert members 60 placed on an insert member standby section 62 are shot by the camera 20.

The drive of the mold 30 is controlled by a controller 50 of the injection molding machine. On the other hand, the motion of the articulated robot 10 is controlled by a robot controller 52. The controller 50 of the injection molding machine and the robot controller 52 are connected to each other.

Moreover, the controller 50 of the injection molding machine is connected to an insert member identification unit 64 as well as to the mold 30. The insert member identification unit 64 is connected to an insert member analysis result storage unit 66, which is connected to an insert member analysis unit 68. Furthermore, the insert member analysis unit 68 is connected to the camera 20.

Figure 5:
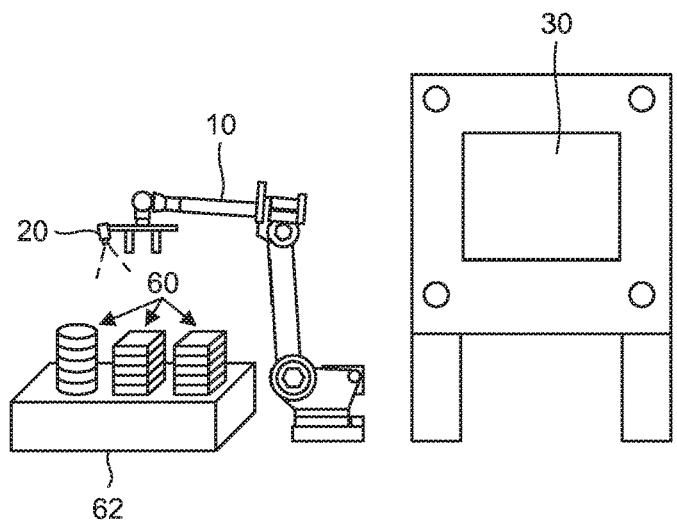
FIG. 5 is a diagram showing a modification in which a mounting position of a camera in the injection molding system of FIG. 4 is changeable.

FIG. 5 is a diagram showing a modification in which a mounting position of the camera 20 in the injection molding system of FIG. 4 is changeable. Those components which are not shown in FIG. 5 are arranged in the same manner as their counterparts shown in FIG. 4 (in which the mounting position of the camera 20 is fixed).

While the camera 20 shown in FIG. 4 is fixedly installed on the floor, the camera 20 shown in FIG. 5 is secured to the distal end portion of the articulated robot 10.

The camera 20 is used to shoot and identify the insert members 60. The camera 20 may be either fixedly installed on the floor, as shown in FIG. 4, or movably attached to the distal end portion of the articulated robot 10, as shown in FIG. 5, only if it is enabled to identify the insert members 60. Since the camera 20 is used to determine the characteristic of each insert member 60, it should preferably have a sufficiently high resolution to analyze images representative of characteristics such as the shape and color of the insert member 60.

The camera 20 shown in FIG. 4 is shooting the insert members 60 placed on the insert member standby section 62. On the other hand, the camera 20 shown in FIG. 5, attached to the articulated robot 10, is movable, so that it can shoot both the insert members 60 on the insert member standby section 62 and the insert member 60 mounted in the mold 30 by moving the articulated robot 10.

The insert member analysis unit 68 analyzes the characteristic of the insert members 60 based on image data on the insert members 60 captured by the camera 20 and sample data extracted from the image data. To achieve this analysis, the overall image of the insert members 60 may be regarded as the characteristic corresponding to each insert member 60. Alternatively, images captured by the camera 20 may be binarized by light and shade so that the areas of white or black parts of the insert members 60 can be calculated and associated with the insert members 60. Moreover, an analysis may be performed within a predetermined shooting area of the camera 20 to achieve association with the insert members 60.

Analysis data for each of the insert members 60 analyzed by the insert member analysis unit 68 is stored in association with the insert members 60 in the insert member analysis result storage unit 66. As this is done, molding conditions for molding the insert member 60 inserted into the mold 30, in addition to the analysis data for the insert members 60, can be stored in association with the analysis data for the insert members 60. If the molding conditions are previously stored in addition to the analysis data for the insert members 60, a molding condition corresponding to an inserted insert member 60 can be output when the insertion of the insert member 60 is determined.

In the present embodiment, the characteristics of the insert members 60 are analyzed based on the image data on the insert members 60 captured by the camera 20 and the sample data extracted from the image data, and the analyzed data is stored in association with the insert members 60 in the insert member analysis result storage unit 66. However, the analysis data need not always be stored, based on image data captured by the camera 20, in the insert member analysis result storage unit 66, and externally created data for the insert members 60 may alternatively be stored in association with the insert members 60 in the insert member analysis result storage unit 66.

The insert member identification unit 64 can identify the shot insert members 60 by comparing the analysis data stored in the insert member analysis result storage unit 66 and the externally given data with the image data captured by the camera 20.

In the present embodiment, the articulated robot 10 is used as an insert member inserting means. If the articulated robot 10 is thus used to insert and eject the insert members 60, the insert/eject operation for the insert member 60 can be performed in a free posture, so that the insert members 60 can easily be inserted and ejected despite their possibly complicated shapes.

As shown in FIG. 4, the insert members 60 are previously arranged side by side on the insert member standby section 62. Also, the standby positions of the insert members 60 on the insert member standby section 62 may be previously stored as standby position information, in association with the analysis data for the insert members 60 and the like, in the insert member analysis result storage unit 66. Thus, if the molding conditions are set, the insert member 60 corresponding to the set molding conditions can easily be inserted into mold 30.

If the insert 40 or the insert member 60 is newly inserted into the mold 30 and the molding conditions are read from the insert analysis result storage unit 56 or the insert member analysis result storage unit 66 and set, in the first and second embodiments described above, a metering process can be started after the molding conditions are set. In some cases, the injection amount may vary depending on the molding conditions. Since a metering operation is performed after the condition setting according to the above configuration, however, an injection process can be performed with an injection amount according to the molding conditions. This arrangement is particularly effective in changing molded articles without changing the resin.

A warning such as an alarm may be output if set molding conditions are different from currently set molding conditions for the insert or insert member when the insert 40 or the insert member 60 is newly inserted into the mold 30. If the molding conditions are thus set so that molding can be stopped by outputting the alarm, an operator can resume the molding after reconfirming the change of the inserts 40 or the insert members 60, the mold 30, or the molding conditions.

The invention claimed is:

1. An injection molding system including, outside a mold, a molding auxiliary member standby section on which a plurality of molding auxiliary members is placed on standby, the system configured to insert at least one of the plurality of molding auxiliary members into the mold to carry out molding, the injection molding system comprising:
   a shooting unit for shooting the plurality of molding auxiliary members;
   a molding auxiliary member data storage unit for storing, for each of the plurality of molding auxiliary members, molding auxiliary member data including
      a characteristic of the molding auxiliary member, and
      a molding condition in which the molding auxiliary member is to be inserted into the mold and molded;
   a transporting unit for transporting, among the plurality of molding auxiliary members, a molding auxiliary member to be inserted into the mold from the molding auxiliary member standby section to the mold;
   a molding auxiliary member identification unit for identifying the molding auxiliary member inserted into the mold;
      wherein the molding auxiliary member identification unit is configured to identify the molding auxiliary member, based on (i) the characteristic of the molding auxiliary member as captured by the shooting unit and (ii) the molding auxiliary member data stored by the molding auxiliary member data storage unit; and
   a metering process starting unit for effecting a metering process after (a) the molding auxiliary member is transported to the mold by the transporting unit, (b) newly reading out the molding condition corresponding to the molding auxiliary member from the molding auxiliary member data storage unit and (c) setting the read molding condition as a condition for molding the molding auxiliary member,
      wherein the metering process is effected by the metering process starting unit until reaching a metering process completion position of the molding condition corresponding to the molding auxiliary member.

2. The injection molding system according to claim 1, wherein the molding auxiliary member is an insert formed with a cavity.

3. The injection molding system according to claim 1, wherein the molding auxiliary member is an insert member for molding an insert-molded article.

4. The injection molding system according to claim 1, wherein, when the molding auxiliary member is shot by the shooting unit, the characteristic of the molding auxiliary member is analyzed based on image data of the shot molding auxiliary member, and the analyzed characteristic is stored as the molding auxiliary member data in the molding auxiliary member data storage unit.

5. The injection molding system according to claim 1, wherein the molding auxiliary member in the mold is identified by the molding auxiliary member identification unit when the molding auxiliary member in the mold is changed for insertion, and the molding condition corresponding to the identified molding auxiliary member is read from the molding auxiliary member data storage unit and set.

6. The injection molding system according to claim 1, wherein the molding auxiliary member identification unit identifies the molding auxiliary member inserted into the mold based on information on the molding auxiliary members remaining on the insert member standby section.

7. The injection molding system according to claim 1, further comprising a molding condition setting unit for setting an external molding condition as a set molding condition, wherein the molding auxiliary member corresponding to the set molding condition is inserted into the mold if the set molding condition disagrees with a molding condition for the molding auxiliary member data corresponding to the molding auxiliary member in the mold identified by the molding auxiliary member identification unit when the set molding condition is set by the molding condition setting unit.

8. An injection molding system which inserts a molding auxiliary member into a mold to carry out molding, the injection molding system comprising:
   a shooting unit for shooting the molding auxiliary member;
   a molding auxiliary member data storage unit for storing at least one molding auxiliary member data in which a characteristic of the molding auxiliary member is stored; and
   a molding auxiliary member identification unit for identifying the molding auxiliary member inserted into the mold,
      wherein the molding auxiliary member identification unit is configured to identify the molding auxiliary member shot by the shooting unit, based on the characteristic of the molding auxiliary member captured by the shooting unit and the molding auxiliary member data stored by the molding auxiliary member data storage unit, wherein the molding auxiliary member data storage unit is configured to store, as the molding auxiliary member data, a molding condition in which the molding auxiliary member is inserted into the mold and molded, in addition to the characteristic of the molding auxiliary member, and wherein a warning is issued if a molding condition corresponding to a molding auxiliary member to be inserted next is different from the currently set molding condition.

9. The injection molding system according to claim 1, wherein the transporting unit is a robot.

10. The injection molding system according to claim 1, wherein the shooting unit is attached to the transporting unit.

* * * * *